(12) United States Patent
Renoux

(10) Patent No.: US 7,018,161 B2
(45) Date of Patent: Mar. 28, 2006

(54) SUCTION HEAD

(75) Inventor: Jerry Renoux, Boulder, CO (US)

(73) Assignee: Blueprint Automation B.V., Woerden (NL)

( * ) Notice: Subject to any disclaimer, the term of this patent is extended or adjusted under 35 U.S.C. 154(b) by 0 days.

(21) Appl. No.: 10/869,927

(22) Filed: Jun. 18, 2004

(65) Prior Publication Data

US 2006/0018747 A1   Jan. 26, 2006

(51) Int. Cl.
*B66C 1/00* (2006.01)

(52) U.S. Cl. ...................... 414/737; 294/64.1
(58) Field of Classification Search ............... 294/64.1; 414/737, 752.1, 788.1, 788.9, 789.9, 790.2, 414/792.9, 793, 794.9; 901/40; 269/21; 279/3

See application file for complete search history.

(56) References Cited

U.S. PATENT DOCUMENTS

| | | | |
|---|---|---|---|
| 3,289,860 A | 12/1966 | Dean | |
| 4,553,892 A * | 11/1985 | Huffman et al. | 414/797 |
| 5,388,879 A * | 2/1995 | Sekiguchi et al. | 294/64.1 |
| 5,632,590 A * | 5/1997 | Pearson et al. | 414/404 |
| 6,056,500 A * | 5/2000 | Wicen | 414/627 |
| 6,106,040 A * | 8/2000 | Focke et al. | 294/64.1 |
| 6,168,220 B1 * | 1/2001 | Schmalz et al. | 294/64.1 |
| 6,435,798 B1 * | 8/2002 | Satoh | 414/217 |
| 6,508,885 B1 * | 1/2003 | Moslehi et al. | 118/728 |
| 6,554,336 B1 | 4/2003 | Hüppi | |
| 6,824,343 B1 * | 11/2004 | Kurita et al. | 414/217 |

* cited by examiner

Primary Examiner—Richard Ridley
(74) Attorney, Agent, or Firm—Young & Thompson

(57) ABSTRACT

Suction head and method for picking articles. The suction head includes a sleeve-like body having a connection to an under pressure source at one end and an opening for picking up articles at the other end thereof. Along side the sleeve channels are provided, connected to the under pressure source, an opening near the lower end of the sleeve. The lower end of the sleeve is delimited by a circumferential edge so that the article is picked with only a small clearance between the article and the inner circumference of the circumferential ring. A platen is provided against which the article is placed. This platen can be moved relative to the sleeve.

5 Claims, 3 Drawing Sheets

SUCTION HEAD

The subject invention relates to a suction head for gripping a number of articles. Such a suction head can be used to pick or grip a number of waver-like articles such as food stuff products, An example of such a suction head is disclosed in U.S. Pat. No. 5,516,125 A. This suction head is used for picking up a semi-conductor die and comprises a sleeve having an upper plate to which a platen is mounted trough spacers. This platen is in a fixed position relative to the upper plate. The end of the sleeve not being connected to the vacuum source, wherein the die is entered, is the straight end of the sleeve.

This suction head is only suitable for picking up a single item.

The invention aims to provide a suction head to grip more than one article in order to provide a stack of articles.

This aim is realized in a suction head for gripping a number of articles comprising a sleeve having a longitudinal axis, a first end for receiving said articles and a second end having a connection to an under pressure source and connections for connecting to a manipulating arm, wherein an abutment platen is provided between said first and said second end, said platen having an outer circumferential shape substantially smaller than the inner circumferential shape of said sleeve, the first end of said sleeve being provided with a circumferential ring extending between said outer and inner circumferential shape of said sleeve and defining an inner circumference corresponding substantially to the outer circumference of said platen.

According to the invention a circumferential ring or lower plate is provided at the bottom of the sleeve. If an article is auctioned after passing the circumferential ring the flow of air will be between the top of the circumferential ring and the lower part of the article. In this way the article will float at a slight distance above the circumferential ring. After a further second article is picked up the first article will be moved one position in upward direction whilst the second article with the first article resting thereon will be in the same position as the original position of the first article i.e. at some distance above the upper surface of the circumferential ring. In this way high speed upward movement of the articles after entering the suction head is prevented as well as damage as consequence thereof.

Basically the platen can have a larger outer circumference than the inner circumference of the circumferential ring. However, according to a preferred embodiment of the invention there is some clearance between the outer circumference of the platen and the inner circumference of the circumferential ring such that the platen can move in or even through the circumferential ring.

To further control the movement of the articles within the suction head and to prevent tilting of disc-shaped articles in the suction head according to a preferred embodiment of the invention the platen is displaceable in the sleeve. In the starting position preferably the platen is positioned somewhat above the upper surface of the circumferential ring. The article which is picked up will then be suctioned through the opening of the circumferential ring and be positioned against the platen. Before a second article is picked up the platen will move one position higher providing space for a second article. In this way a controlled stacking of articles within the suction head can be realized.

However, such a displaceable provision of said platen also allows controlled discharge of the suction head. If the suction head is filled as required with articles and displaced to a discharging position except from releasing the vacuum, also the platen can be pushed outwardly such that the articles are discharged in a controlled way in for example a package for food stuff.

According to a further embodiment of the invention the sleeve is provided at its inner circumference with guiding channels which function on the other hand to connect the under pressure from an under pressure source at the top of the sleeve to the lower end of the sleeve. It is possible to provide suction both at the lower end of the sleeve and in the area wherein the articles are stacked. Such guiding channels can be obtained by corrugating the sleeve.

Preferably the platen is shaped to be positioned adjacent to the channels described above, The invention also relates to a method for picking a number of articles and forming a stack, comprising positioning a suction head above a first article to be picked, applying under pressure in said suction head and moving said first article by said under pressure against an abutment platen provided in said suction head, picking a second article by said suction head and moving said second article against said first article to form a stack, wherein before picking said second article said platen together with said first article is further moved into said suction head.

The invention will be further elucidated referring to preferred embodiments of the invention shown in the drawings, wherein.

Figure 1:
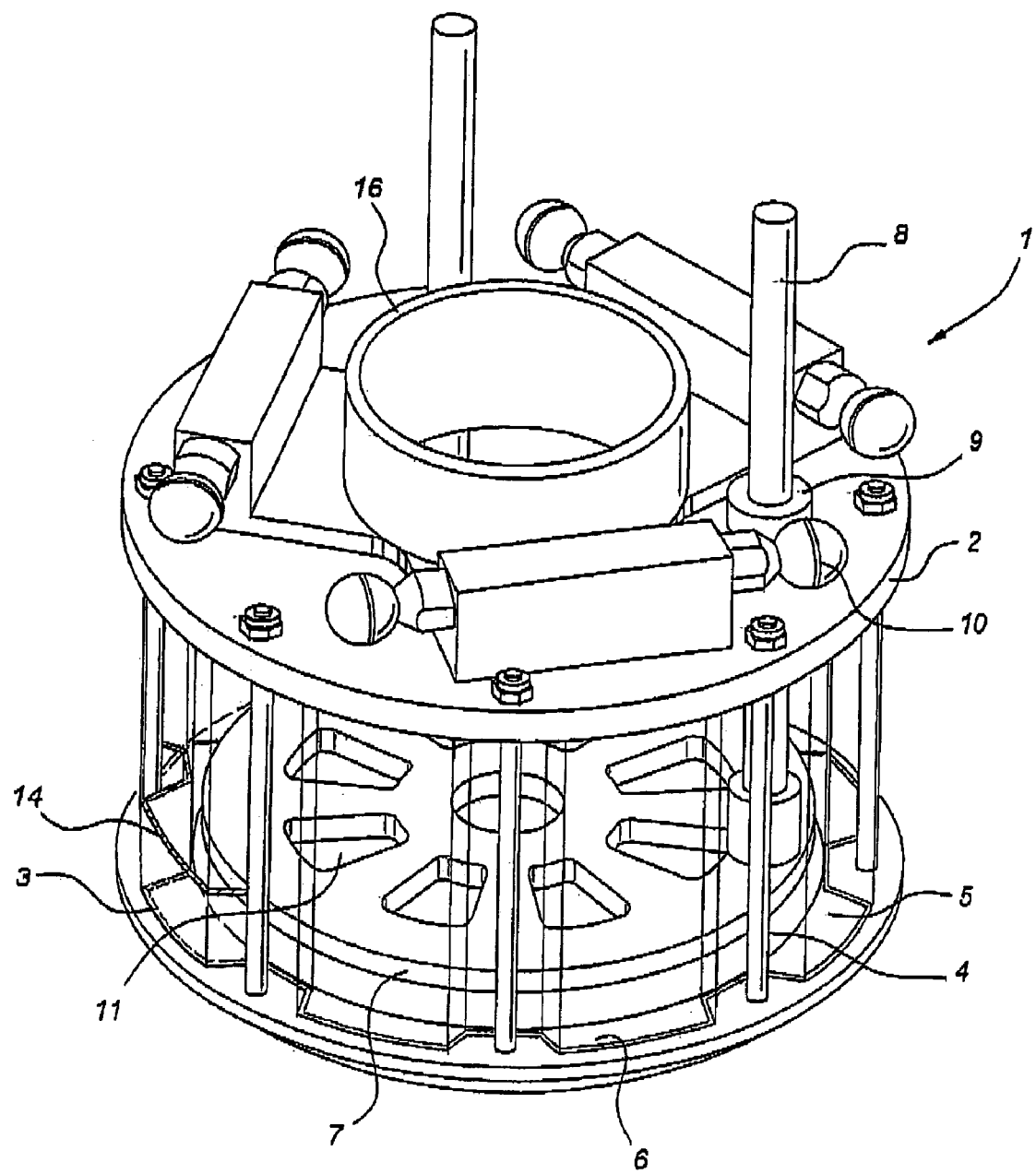
FIG. 1 shows in perspective view a first embodiment of the suction head according to the invention.
Figure 2:
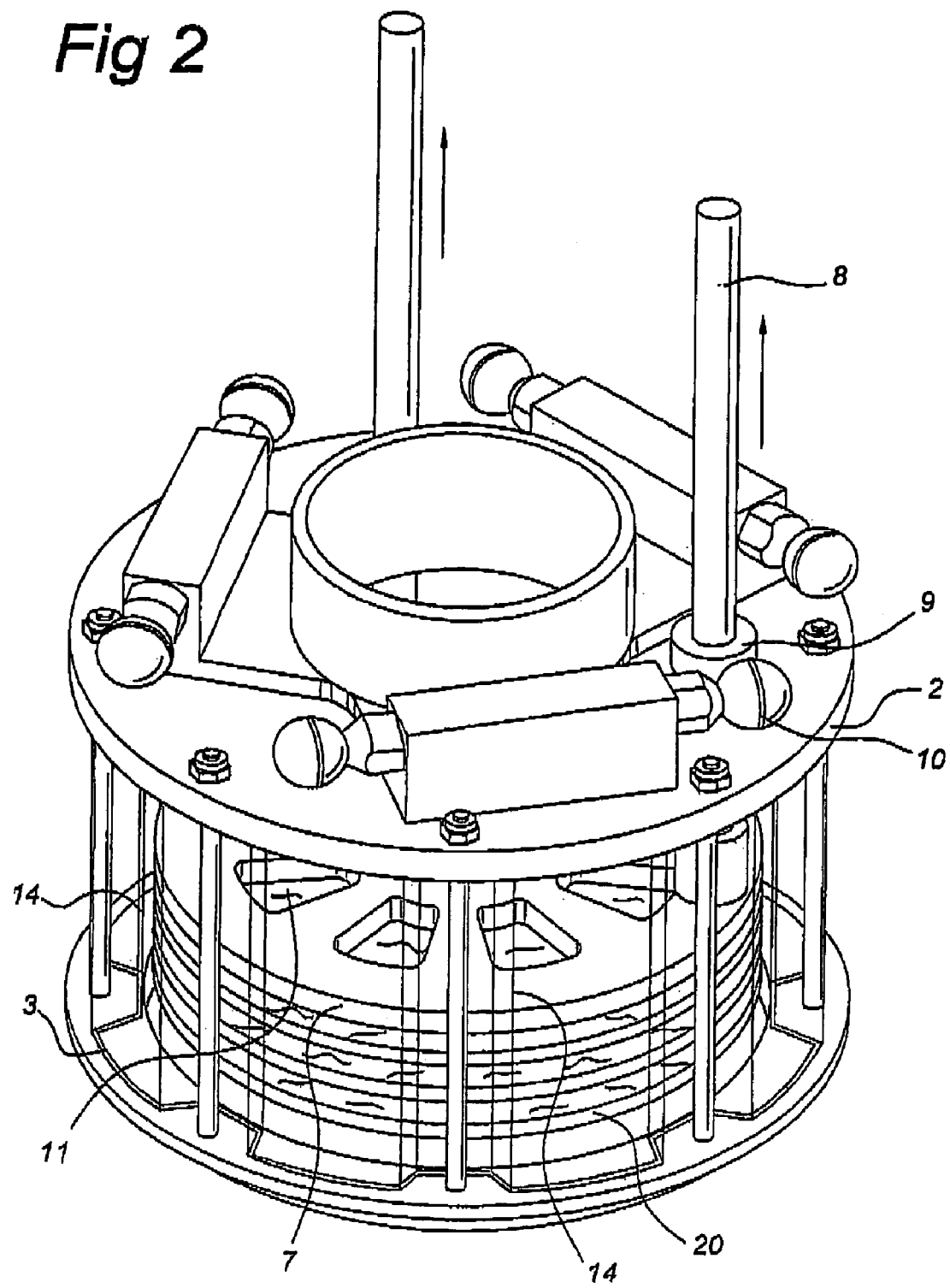
FIG. 2 shows the suction head according to FIG. 1 of the gripping articles.
Figure 3:
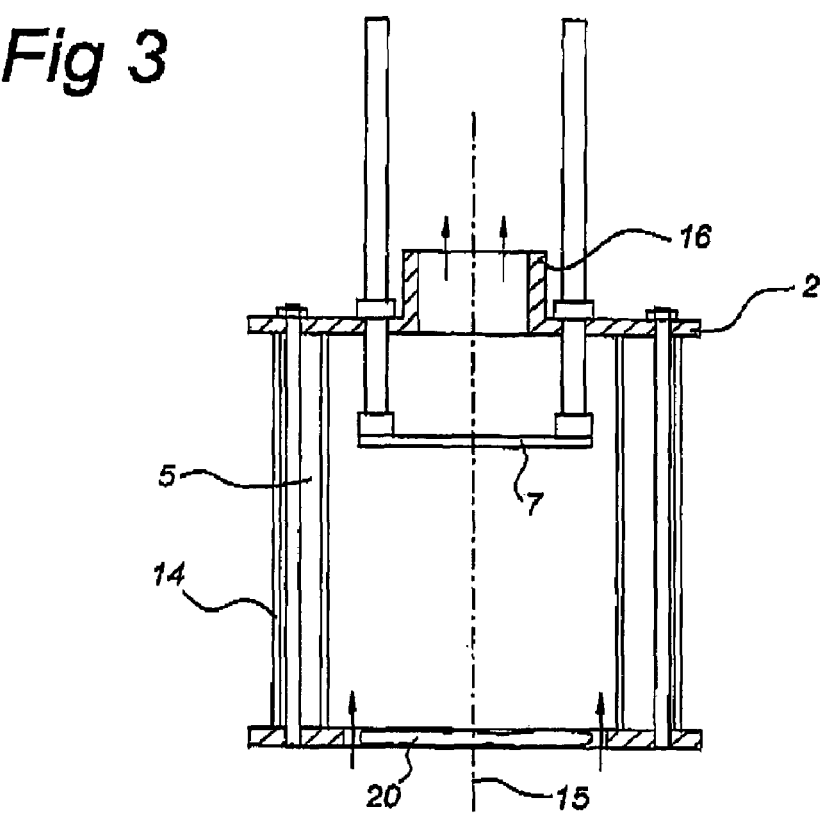
Figure 4:
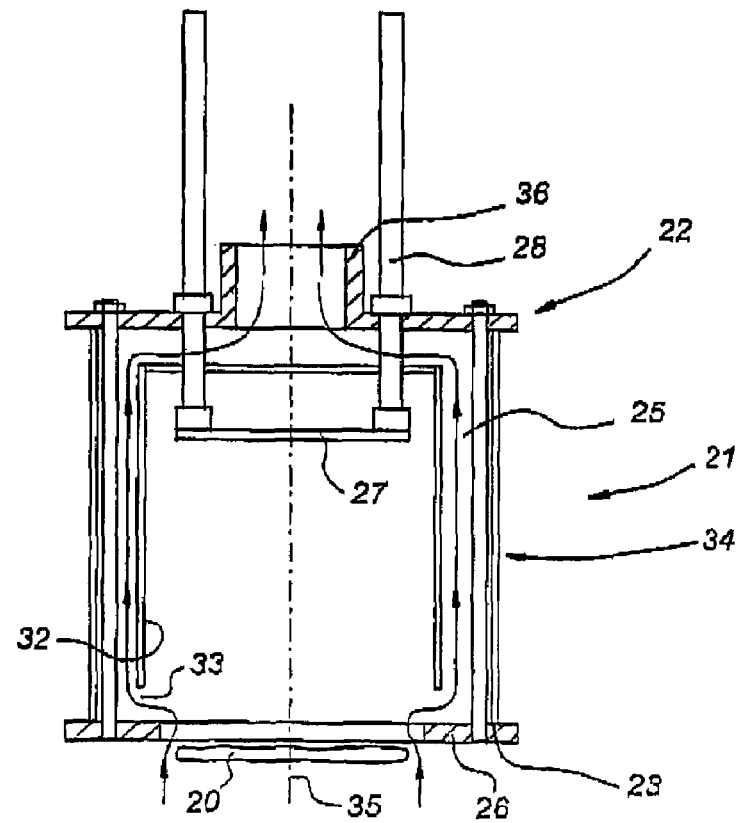

FIG. 3 schematically shows the air flow in the gripping head according to FIGS. 1 and 2; and FIG. 4 shows an alternative of the suction head according to the invention.

In FIG. 1 the suction head according to the invention is generally referred to by 1. The suction head comprises a corrugated sleeve 14 having a lower edge 3. An upper plate 2 is provided on top of the sleeve 14. A lower plate or circumferential ring 6 is connected to the lower edge 3 and protrudes perpendicular from the sleeve 14. The upper plate 2 and circumferential 6 are connected through spacer rods 4. Channels 5 are defined by the corrugations of the sleeve and provide flow communication between the connection 16 coupled to a source of under pressure and the lower edge 3. The upper plate 2 is provided with guiding bushes 9 for guiding a slide bar 8 connected to platen 7. However, it should be noted that platen 7 can be guided/operated in any other way from upper plate 2.

15 indicates the longitudinal axis of the sleeve 14. Openings 11 can be provided in the platen. Channels 5 provide flow connection between the inlet opening of the circumferential ring or lower plate and connection 16. The suction head is connected to an arm not shown to coupling balls 10. Other connecting means can be used.

This device functions as follows. Through an arm not shown the suction head 1 is positioned above a surface from which the articles such as food stuff and more particular frozen pancakes, have to be picked. The platen 7 is in a low position and there is a continuous flow of air to the under pressure source. As soon as the suction head is above an article to be picked it is lowered and the related article is moved through the lower plate 6 and contacts the lower surface of the platen 7. In this position the article is just above the lower plate 6. Because the main flow of air is from below the article through the corrugations the article will be in a semi-floating condition against the platen 7. Subsequently the suction head is indexed in upward direction. If the next article to be gripped is found, the suction head is lowered and the platen 7 is moved one position in upward direction. The next second article is positioned in the original position of the first article. After three articles have been picked this way the position of FIG. 2 is realized. After receiving an article the platen is indexed upwardly and the next article is taken away from the related surface. After the desired number of articles is formed the suction head is moved to a discharge position. After removal of the under pressure and possibly using over pressure and through downward movement of the platen, the stack of articles is conveyed to a further desired position.

In the room above the platen 7 there is some under pressure. This under pressure is transferred to the first article.

In FIG. 4 a further embodiment of the invention is shown. The suction head is generally referred to by 21 and comprises an upper platen 22, lower edge 23 as well as separate air flow channels 25. However, these channels are closed all around and only function for guidance of the articles and fluid connection for under pressure. The lower plate has reference number 26 whilst platen 27 can be moved in upward and downward direction through actuating of a slide bar 28. The actuating mechanism for the slide bar is not shown.

The sleeve of the suction head is referred to by 34 whilst the axis of movement of the slide bar 28 has reference 35. 36 is the vacuum connection In this embodiment there are openings 33 between the lower plate 26 and the channels or inner sleeve 32. In this case if a group of articles is picked up the lowest article will pressurize the articles there above against the platen 27. The platen 27 is indexed upward as the articles are accumulated.

The device as described above allows for gripping a large number of articles such as wafer shaped articles having a size substantially corresponding to the size of the platen. The articles are gripped in a fast and gentle way which allows for a high throughput without the risk of damaging the articles.

After reading the above the person skilled in the art will immediately be able to effect other embodiments which are obvious after the above and within the range of the appended claims.

What is claimed is:

1. Suction head (1,21) for gripping a number of articles (20) comprising a sleeve (14,34) having a longitudinal axis (15,35), a first end (3,23) for receiving said articles and a second end (2,22) having a connection (16,36) to an under pressure source and connections (10) for connecting to a manipulating arm, wherein an abutment platen (7,27) is provided between said first and said second end, said platen having an outer circumferential shape substantially smaller than the inner circumferential shape of said sleeve, the first end of said sleeve being provided with a circumferential ring (6,26) extending between said outer and inner circumferential shape of said sleeve (14,34) and defining an inner circumference corresponding substantially to the outer circumference of said platen, wherein said platen is displaceable in said sleeve in the direction of said longitudinal axis, and wherein said second end (2) comprises a guide bore (9) for receiving a bar (8) connected to said platen.

2. Suction head according to claim 1, wherein a clearance is provided between said platen and said circumferential ring.

3. Suction head according to claim 1, wherein said sleeve (14,34) is provided at its inner circumference with an under pressure channel (5,25) being connected to the under pressure source connection (16,36) at one end and opening near said circumferential ring (6,26) at the other end.

4. Suction head according to claim 3, wherein said under pressure connection (16,36) is only connected to said under pressure channel.

5. Suction head according to claim 3, wherein the outer surface of said platen (7,27) is adjacent to the inner surface of said under pressure channel.

\* \* \* \* \*